US011120388B2

(12) United States Patent
Zhang et al.

(10) Patent No.: US 11,120,388 B2
(45) Date of Patent: Sep. 14, 2021

(54) UNMANNED AERIAL VEHICLE, AND METHOD AND SYSTEM FOR DELIVERING CARGO WITH UNMANNED AERIAL VEHICLE

(71) Applicant: SZ DJI TECHNOLOGY CO., LTD., Shenzhen (CN)

(72) Inventors: Xingyu Zhang, Shenzhen (CN); Cong Zhao, Shenzhen (CN); Ketan Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 387 days.

(21) Appl. No.: 15/607,467

(22) Filed: May 27, 2017

(65) Prior Publication Data
US 2017/0262789 A1 Sep. 14, 2017

Related U.S. Application Data

(63) Continuation of application No. PCT/CN2014/092448, filed on Nov. 28, 2014.

(51) Int. Cl.
| *B64D 17/48* | (2006.01) |
| *G07C 9/00* | (2020.01) |
| *H04N 7/18* | (2006.01) |
| *G06Q 10/08* | (2012.01) |

(52) U.S. Cl.
CPC ........ *G06Q 10/08* (2013.01); *B64C 2201/128* (2013.01); *G06Q 10/0833* (2013.01)

(58) Field of Classification Search
CPC ........... B64D 1/12; G08G 5/0069; G08G 5/02
See application file for complete search history.

(56) References Cited

U.S. PATENT DOCUMENTS

| 6,889,942 | B2 * | 5/2005 | Preston | B64D 17/74 244/152 |
| 7,059,570 | B2 * | 6/2006 | Strong | B64D 1/08 244/147 |
| 8,140,358 | B1 * | 3/2012 | Ling | G07C 5/008 705/4 |
| 8,403,267 | B2 | 3/2013 | Olden | |
| 8,939,056 | B1 * | 1/2015 | Neal, III | B64D 17/80 89/1.51 |
| 9,459,620 | B1 * | 10/2016 | Schaffalitzky | G06Q 10/083 |

(Continued)

FOREIGN PATENT DOCUMENTS

| CN | 1408096 A | 4/2003 |
| CN | 103778523 A | 5/2014 |

(Continued)

OTHER PUBLICATIONS

The World Intellectual Property Organization (WIPO) International Search Report for PCT/CN2014/092448 dated Aug. 17, 2015 5 Pages.

*Primary Examiner* — Talia F Crawley
(74) *Attorney, Agent, or Firm* — Anova Law Group, PLLC

(57) ABSTRACT

A delivering method using an unmanned aerial vehicle includes configuring a pre-set condition, locking a cargo, acquiring verification information about a recipient, comparing the verification information with the pre-set condition, and determining that verification is passed to unlock the cargo when the verification information is consistent with the pre-set condition.

16 Claims, 5 Drawing Sheets

(56) References Cited

U.S. PATENT DOCUMENTS

| | | | | |
|---|---|---|---|---|
| 9,580,173 B1* | 2/2017 | Burgess | | B64D 1/22 |
| 9,589,439 B2* | 3/2017 | Golden | | B60R 25/04 |
| 9,619,955 B2* | 4/2017 | Eichenblatt | | H04N 7/183 |
| 2003/0197095 A1* | 10/2003 | Preston | | B64D 17/04 |
| | | | | 244/152 |
| 2010/0332359 A1* | 12/2010 | Powers | | E05B 83/02 |
| | | | | 705/28 |
| 2011/0084162 A1* | 4/2011 | Goossen | | B64D 1/22 |
| | | | | 244/12.1 |
| 2014/0165675 A1* | 6/2014 | Morita | | E05B 77/44 |
| | | | | 70/256 |
| 2014/0379179 A1* | 12/2014 | Goossen | | G05D 1/0684 |
| | | | | 701/18 |
| 2015/0120529 A1* | 4/2015 | Faaborg | | G06Q 10/083 |
| | | | | 705/39 |
| 2016/0012730 A1* | 1/2016 | Jarrell | | G08G 5/003 |
| | | | | 701/8 |
| 2016/0027273 A1* | 1/2016 | Golden | | B60R 25/102 |
| | | | | 348/152 |
| 2016/0068265 A1* | 3/2016 | Hoareau | | G06Q 10/083 |
| | | | | 701/3 |
| 2016/0104098 A1* | 4/2016 | Matula | | H04L 61/6022 |
| | | | | 701/23 |
| 2016/0107750 A1* | 4/2016 | Yates | | B64C 39/024 |
| | | | | 244/2 |
| 2016/0189101 A1* | 6/2016 | Kantor | | G08G 5/0026 |
| | | | | 705/338 |
| 2016/0196751 A1* | 7/2016 | Jarrell | | B64F 1/362 |
| | | | | 340/971 |
| 2016/0196753 A1* | 7/2016 | Jarrell | | G05D 1/101 |
| | | | | 701/16 |
| 2017/0320569 A1* | 11/2017 | Gordon | | B64C 39/024 |
| 2018/0072419 A1* | 3/2018 | Burgess | | B64C 39/024 |
| 2018/0108192 A1* | 4/2018 | Ho | | H04L 67/125 |

FOREIGN PATENT DOCUMENTS

| | | |
|---|---|---|
| CN | 103914076 A | 7/2014 |
| WO | 2013055441 A2 | 4/2013 |
| WO | 2013055441 A3 | 8/2013 |
| WO | 2014169354 A1 | 10/2014 |

* cited by examiner

UNMANNED AERIAL VEHICLE, AND METHOD AND SYSTEM FOR DELIVERING CARGO WITH UNMANNED AERIAL VEHICLE

CROSS-REFERENCE TO RELATED APPLICATION

This is a continuation application of International Application No. PCT/CN2014/092448, filed on Nov. 28, 2014, the entire contents of which are incorporated herein by reference.

TECHNICAL FIELD

The present disclosure relates to the field of unmanned aerial vehicles, and in particular to unmanned aerial vehicles, and methods and systems for delivering cargo with an unmanned aerial vehicle.

BACKGROUND

A famous American e-commerce corporation, Amazon, and a Chinese carrier company, SF-Express, have both been planning and testing express delivery utilizing unmanned aerial vehicles, especially for transporting small goods to remote regions. Commodity delivery by unmanned aerial vehicles has the great advantages of being convenient and fast, timely cargo delivery, and saving on labour costs, etc.

It is known that the unmanned aerial vehicle delivery by SF-Express has finished the test stage and has entered a trial operation stage. However, its service is not directly open to clients, but involves distribution among different branches of SF-Express, delivering commodities to branches where manual distribution is relatively difficult and slow. The unmanned aerial vehicle operation used by SF-Express needs to be accomplished by professionals, and due to the fact that take-off and landing of the unmanned aerial vehicle are both operated by professionals, there needs to be a professional to supervise delivery and receipt of commodities when the unmanned aerial vehicle arrives at a place of receipt.

With the trend in the application of unmanned aerial vehicles in the express delivery industry, how to ensure that cargo is safely delivered to a recipient has become a big security issue.

SUMMARY

In view of this, the present disclosure provides unmanned aerial vehicles, and methods and systems for delivering cargo with an unmanned aerial vehicle.

One object of the present disclosure is to provide a method for delivering cargo with an unmanned aerial vehicle. One embodiment disclosed herein comprises:

configuring a pre-set condition, so that during verification, if a condition satisfies the pre-set condition, then the verification is passed;

locking a cargo, so that the cargo is unlocked after the verification is passed;

acquiring verification information, with the verification information being used for identifying the identity of a recipient and/or the location of the unmanned aerial vehicle; and unlocking the cargo when the verification information satisfies the pre-set condition.

Another object of the present disclosure is to provide systems for delivering cargo with an unmanned aerial vehicle. One exemplary embodiment comprises:

a configuration unit for configuring a pre-set condition, so that during verification, if a condition satisfies the pre-set condition, the verification is passed;

a locking unit for locking cargo, so that the cargo is unlocked after the verification is passed;

an acquisition unit for acquiring verification information, with the verification information being used for identifying the identity of a recipient and/or the location of the unmanned aerial vehicle; and an unlocking unit for unlocking the cargo when the verification information satisfies the pre-set condition.

Another object of the present disclosure is to provide unmanned aerial vehicles. One exemplary embodiment comprises:

a sensor for recognizing verification information, wherein the verification information comprises information about a recipient or information about the unmanned aerial vehicle;

a security lock for locking cargo;

a memory for storing pre-set unlocking information; and a controller communicatively connected to the sensor, the security lock, and the memory, respectively, wherein the sensor transmits the acquired verification information to the controller, and the controller controls the security lock to unlock the cargo when the verification information matches the pre-set unlocking information.

The present disclosure provides unmanned aerial vehicles, and methods and systems for delivering cargo with an unmanned aerial vehicle. By using a pre-set condition, acquiring verification information about a recipient, comparing the verification information with the pre-set condition, and determining that verification is passed when the verification information is consistent with the pre-set condition to unlock cargo, false claim or loss of the cargo is avoided, and the security of cargo transportation can be improved.

DETAILED DESCRIPTION OF THE EMBODIMENTS

Figure 1:
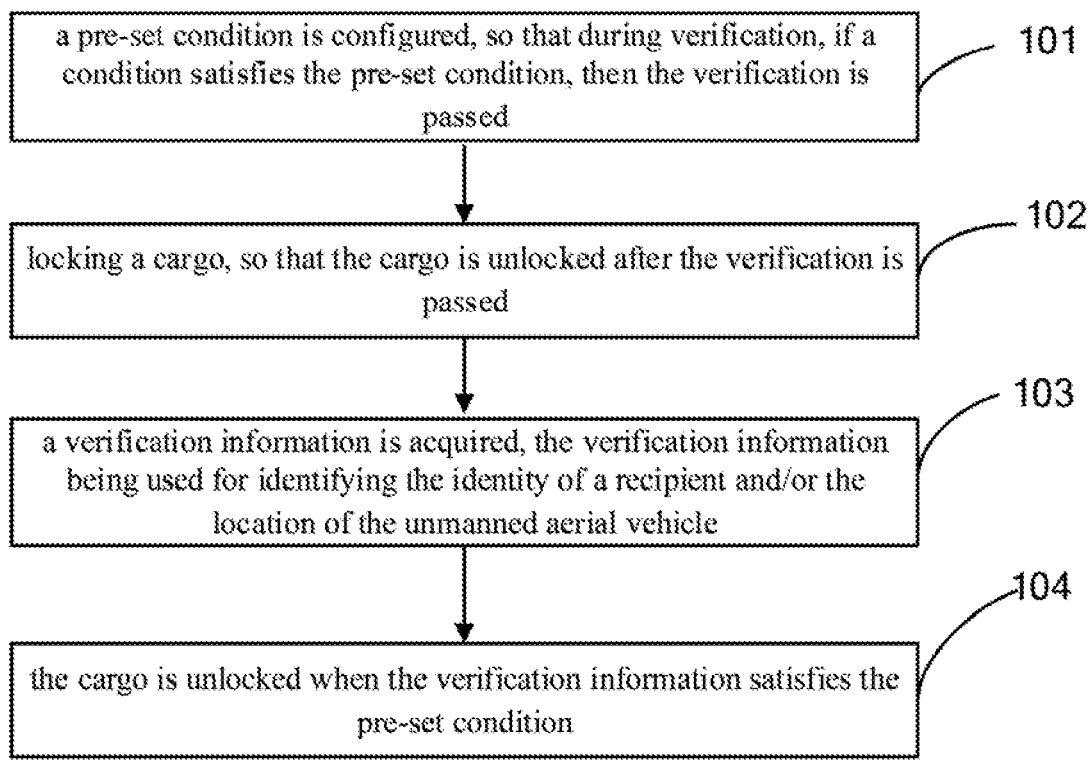
FIG. 1 is a flow chart of an embodiment of a method for delivering cargo with an unmanned aerial vehicle according to the present disclosure.

Technical solutions of the present disclosure will be described with reference to the drawings. It will be appreciated that embodiments as described in the disclosure are a part rather than all of the embodiments of the present disclosure. Other embodiments, which are conceived by those having ordinary skills in the art on the basis of the disclosed embodiments without inventive efforts, should fall within the scope of the present disclosure.

The present disclosure provides unmanned aerial vehicles, and methods and systems for delivering cargo with an unmanned aerial vehicle. By using a pre-set condition, acquiring verification information about a recipient, comparing same with the pre-set condition, and determining that verification is passed when the verification information is consistent with the pre-set condition to unlock cargo, false claim or loss of the cargo is avoided, thereby improving the security of cargo transportation.

In order to help those skilled in the art to better understand the present disclosure, the technical solutions in some embodiments of the present disclosure are hereinafter described clearly and in detail with reference to the accompanying drawings. Evidently, the described embodiments are only some embodiments rather than all embodiments of the present disclosure. All other embodiments which could be obtained by those skilled in the art without creative efforts, based on the embodiments of the present disclosure, shall all fall within the scope of protection of the present disclosure.

The terms "first", "second", "third", "fourth", etc. in the description, claims and the accompanying drawings of the present disclosure are all used for distinguishing similar objects rather than describing a particular sequence or precedence order. It should be understood that the numerals used herein may be interchanged in suitable cases, so that the embodiments described herein may be implemented in an order other than the contents illustrated or described herein. In addition, the terms "comprise" and "have" and any of their variants intend to cover non-exclusive inclusion, for example, a process, method, system, product or device containing a series of steps or units is not necessarily limited to those steps or units clearly listed, but may comprise other steps or units which are not clearly listed or inherent to this process, method, product or device.

The technical solutions in the embodiments of the present disclosure are hereinafter described clearly and in detail with reference to the accompanying drawings. Evidently, the described embodiments are only some embodiments rather than all embodiments of the present disclosure. All the other embodiments which could be obtained by those skilled in the art based on the embodiments of the present disclosure and without creative effort, shall all fall within the scope of protection of the present disclosure. The embodiments below and the technical features in the embodiments may be combined in other manners if there is no conflict.

Referring to FIG. 1, the present disclosure provides an embodiment of a method for delivering cargo with an unmanned aerial vehicle, which is applied to an unmanned aerial vehicle, the method comprising:

101, a pre-set condition is configured, so that during verification, if a condition satisfies the pre-set condition, then the verification is passed.

The pre-set condition may comprise: at least one of the coordinates of a pre-determined location of the recipient, an environment picture of a landing site of the unmanned aerial vehicle taken in advance (also referred to as a "pre-taken environment picture"), a guide signal sent by the recipient ("pre-set guide signal"), identity information ("pre-set identity information") of the recipient, biological recognition information ("pre-set biological recognition information") of the recipient, voice print information ("pre-set voice print information") of the recipient, signature handwriting (or simply "signature") of the recipient, or a graphic code ("pre-set graphic code") generated according to information about the recipient. A user may select a variety of pre-set conditions for verification as required. The more pre-set conditions, the higher the verification accuracy is. Certainly, the more pre-set conditions, the more response verification processes are. The user may make flexible selection as required. There are no particular limitations. With regard to the pre-set conditions, there may be other ways, for example, a pre-set command or a password. The recipient may be verified by means of a password. The recipient is verified when the pre-set condition is met. Specific manners of verification will not be enumerated exhaustively.

The recipient may be a user who signs for receipt of the cargo or an agent who signs for receipt the cargo on the user's behalf. It may also be a robot used for automatic signing. It can be flexibly selected as required and will not be limited.

With regard to the coordinates of a pre-determined location of the recipient, it may be address information input by the user when buying the cargo, wherein the address information may comprise the coordinates of a location where the user receives the cargo, e.g. GPS coordinates, and Beidou positioning coordinates may also be used. With regard to the location coordinates, positioning techniques in existing technology may be used, as long as they can accurately identify the receiving address of the recipient, i.e. a cargo delivery destination for the unmanned aerial vehicle, and the kind of positioning system used therein is not limited.

The environment picture of a landing site of the unmanned aerial vehicle taken in advance may be an environment picture of a landing site taken in advance at a place where the recipient receives the cargo, i.e. a landing site of the unmanned aerial vehicle. The environment picture should include a static object so that the unmanned aerial vehicle flies near the landing site via techniques such as cruising, then performs matching according to the environment picture and accurately lands at a specified unmanned aerial vehicle landing site. With regard to unmanned aerial vehicle image matching and positioning techniques, those skilled in the art should understand. Different techniques may be used as long as they satisfy the condition that the unmanned aerial vehicle can accurately land at a specified landing site according to a landing site picture taken in advance. The specific manners will not be described in detail herein.

The guide signal sent by the recipient may be a specific method whereby the recipient transmits electromagnetic waves, e.g. infrared rays, or laser beams, to the unmanned aerial vehicle, when the unmanned aerial vehicle flies over a certain range above the location of the recipient. The unmanned aerial vehicle flies to the location of the recipient according to the guidance of the electromagnetic waves. Regarding the techniques with which the infrared rays guide the unmanned aerial vehicle to land or the laser beams guide the unmanned aerial vehicle to land, those should be understood by those skilled in the art and will not be specifically described herein.

The identity information about the recipient may be personal identity information about the recipient, e.g. identity card information, social insurance card information, etc. The identity information about a card holder may be acquired by scanning a relevant certificate, and whether he/she is the recipient is determined according to a comparison between the identity information and pre-set identity information. Specific techniques about determining whether he/she is the recipient via identity information will not be limited.

The biological recognition information about the recipient is used to recognize whether he/she is a real recipient. The recipient's biological recognition feature is unique, and the biological recognition feature of every one is different, thus whether he/she is a real recipient may be determined by acquiring the recipient's biological recognition feature. For example, it can be done by storing fingerprint information or iris information about the recipient in advance, which may be uploaded by the recipient in advance, and the unmanned aerial vehicle determines whether he/she is a real recipient by scanning a fingerprint or iris when verifying the recipient, and then comparing the fingerprint or iris with the pre-stored fingerprint information or iris information. With regard to biological recognition techniques, those skilled in the art should understand, which will not be described herein.

The voice print information about the recipient is used to determine whether the recipient is a real recipient. The specific process may be that the recipient uploads in advance an audio or voice print information obtained after processing the audio. When the recipient uploads an audio, the audio may be processed to obtain corresponding voice print information and then the voice print information is saved. The voice print information may be directly saved in the unmanned aerial vehicle and directly used for comparison; and the audio may also be processed by remotely calling an API interface to obtain voice print information, or the voice may be sent for remote processing and comparison, the unmanned aerial vehicle is notified of the comparison result. Whether he/she is a real recipient may be determined via the voice print. With regard to the specific implementation of voice print recognition, it should be understood by those skilled in the art, and will not be described herein.

The signature handwriting of the recipient may be pre-set. The recipient uploads his/her own signature handwriting in advance, and then signs during recipient verification. The signature is then scanned and compared it with the signature handwriting uploaded in advance: if the handwriting is consistent, it is determined that he/she is a real recipient, and thus a subsequent operation is carried out, e.g. unlocking. With regard to the comparison of handwriting and how to determine whether the two sets of handwriting are consistent, specific techniques are not described herein.

The information about the recipient, e.g. an account name, or other identity information, may be processed via graphic encoding, for example, the information about the recipient may be used to generate a two-dimensional code or a bar code, or other graphic codes. Corresponding code information is obtained by scanning and processing these graphic codes. Whether this code information is consistent with the information about the recipient is determined, and if so, then it is confirmed that he/she is a real recipient. With regard to how to generate the information about the recipient into a graphic code, this should be understood by those skilled in the art and will not be limited.

It needs to be noted that the pre-set condition may be saved in the unmanned aerial vehicle, and information such as the pre-set condition may also be saved in a ground station via the unmanned aerial vehicle. The ground station performs data exchange communications with the unmanned aerial vehicle. The ground station may be connected to the Internet. The recipient may upload information required for a pre-set condition via the Internet, for example, a user is shopping on-line, and uploads information about a pre-set condition, e.g. fingerprint information or iris information, or voice print information, onto a website database at the same time while shopping; the website database performs data exchange with the ground station; the ground station may save the data locally and may also configure and stored the data in a storage system of the unmanned aerial vehicle; and the unmanned aerial vehicle verifies the recipient using the pre-set condition.

102, locking the cargo, so that the cargo is unlocked after the verification is passed.

The to-be-transported cargo is loaded on the unmanned aerial vehicle; a security lock is used for locking the cargo. A recipient without being verified cannot use a legal means to open the security lock. The security lock should satisfy the requirements of preventing malicious breaking, and high reliability. Specific structure of the lock is not limited.

With regard to a locking timing of the cargo by the unmanned aerial vehicle, two implementation methods are provided herein: automatically locking the cargo when the unmanned aerial vehicle takes off, i.e. automatically locking the cargo after the unmanned vehicle takes off to prevent the cargo from falling off, and avoid the occurrence of cargo falling during the flight of the unmanned aerial vehicle resulting from forgetting to lock the cargo due to negligence. Alternatively, manually locking the cargo before the unmanned aerial vehicle takes off, so that the cargo is in a locked state during the flight of the unmanned aerial vehicle, and the locking timing may be flexibly selected, which simplifies the structure of the security lock and reduces the failure rate.

103, verification information is acquired, the verification information being used for identifying the identity of a recipient and/or the location of the unmanned aerial vehicle.

It needs to be noted that the verification information may comprise identifying the identity of the recipient and the location of the unmanned aerial vehicle, or only comprise the identity of the recipient, or only comprise the location of the unmanned aerial vehicle. With regard to the verification information, it can be limited correspondingly according to the pre-set condition, and will be introduced in detail below. Different kinds of information may be selected and combined, as required.

The step of acquiring the verification information about the recipient may comprise at least one of the following:

I. The coordinates of the current location of the unmanned aerial vehicle are acquired. A positioning system may be installed in the unmanned aerial vehicle, wherein the positioning system may be selected as GPS (global positioning system) or a Beidou navigation satellite system, or other systems. The positioning system records the coordinates of the current location in real time and may compare the current location with predetermined location coordinates of the recipient. It may transmit the information back to the ground station and use the ground station to perform the comparison. Various manners may be used, as long as the coordinates of the location of the unmanned aerial vehicle can be compared with the coordinates of a pre-set location of the recipient.

II. An environment picture of a landing site of the unmanned aerial vehicle is taken. After arriving above the location of the recipient, the unmanned aerial vehicle takes a photo of the ground environment and saves the environment picture and compares same with a pre-set environment picture of the recipient to determine whether the environment of the recipient is reached, and thus determines whether it is the environment of the recipient, and unlocking may be performed after arriving at the environment of the recipient.

III. A guide signal sent by the recipient is received. The unmanned aerial vehicle receives the guide signal sent by the recipient, flies to the location of the recipient according to the guide signal and lands, and after arrival is determined, unlocking may be performed.

IV. Identity recognition card information about the recipient is read. After the unmanned aerial vehicle lands, by scanning the identity recognition card of the recipient, wherein the identity recognition card may be sensed and recognized via a sensor mounted on the body of the unmanned aerial vehicle, the information about the identity recognition card is read.

In some embodiments, the identity recognition card of the recipient comprises at least one of a second generation identity card, a social insurance card, a housing funds card, a passport, and a pass card, and certainly there may also be other identity recognition cards, which will not be limited.

V. A biological recognition feature of the recipient is scanned. A biological recognition feature of the recipient is scanned via a biological recognition instrument, the biological recognition feature of the recipient, e.g. fingerprint information, iris information or a facial profile, is acquired, and then these biological recognition features are compared with pre-set biological recognition information to verify the recipient.

In some embodiments, the biological recognition information comprises fingerprint information about the recipient and/or iris information about the recipient; and the biological recognition feature is a fingerprint of the recipient and/or an iris of the recipient, so that matching and verification are performed by scanning the fingerprint and/or iris of the recipient, and comparing with the pre-set fingerprint information about the recipient and/or iris information about the recipient.

VI. Voice input by the recipient is received and processed to obtain corresponding voice print information. The voice of the recipient who is signing is recorded via a sound recording device mounted in the unmanned aerial vehicle, and then the voice is processed to obtain voice print information corresponding to the voice. How to process voice to obtain voice print information should be understood by those skilled in the art and will not be described herein. Various techniques may be used, as long as the condition of recognizing a recipient via voice print information is satisfied.

It needs to be noted that verification may also be performed by directly using a voice command. For example, a command for signing is pre-set, commands are compared when the recipient signs, and if the commands are consistent, the verification is passed. For example, a command "hello" is pre-set, when the recipient speaks "hello" when he signs, the commands are consistent and the verification is passed. The specific content of the command may be set as required, as long as it ensures confidentiality, which will not be specifically limited.

VII. Electronic signature information about the recipient is recognized and acquired. A touch panel or a camera is additionally mounted on the unmanned aerial vehicle; the recipient signs on the touch panel and an electronic signature is obtained after being processed, or the recipient writes a signature on paper, the camera takes a photo of the signature, obtains an electronic version of the signature by processing the photo, and then compares the electronic signature or the electronic version of the signature with the handwriting stored in advance, so as to achieve the purpose of verifying the identity of the recipient.

VIII. A graphic code of the recipient is scanned and decoded to obtain corresponding code information. A radio frequency tool or a camera may be additionally mounted on the unmanned aerial vehicle, and the graphic code provided in the recipient is scanned, for example, scanning a bar code via the radio frequency tool, or scanning a two-dimensional code via the camera, as long as the instrument obtains the information about the graphic code.

In some embodiments, the graphic code comprises a two-dimensional code or a bar code, and certainly other forms of graphic codes may be used, which will not be specifically limited.

With regard to conditions I to VIII above, they may be selected as required. The verification may be passed when all of them are satisfied, and the verification may also be passed when some of them are satisfied. This can be flexibly selected and is not limited. By using the conditions above, the process of verification may be more accurate, which accurately recognizes the identity of the recipient and improves security.

104, the cargo is unlocked when the verification information satisfies the pre-set condition.

When the verification information satisfies the pre-set condition, the method satisfies at least one of the following conditions, then the verification information satisfies the pre-set condition, and if the verification information satisfies the verification condition, the cargo is unlocked, and the recipient may sign for receiving the cargo, which improves the security of cargo transportation, and reduces the risk of false claim of the cargo, which will be further illustrated below:

I. the coordinates of the current location of the unmanned aerial vehicle being consistent with the coordinates of the pre-determined location of the recipient;

II. the environment picture taken for the landing site of the unmanned aerial vehicle matching the environment picture of the landing site of the unmanned aerial vehicle taken in advance;

III. having received the guide signal of the recipient, and landing at a specified place according to the guide signal;

IV. the information obtained by reading the identity recognition card of the recipient being consistent with the identity information about the recipient;

V. the scanned biological recognition feature of the recipient matching the biological recognition information about the recipient;

VI. the corresponding voice print information obtained by processing the received voice input by the recipient being consistent with the voice print information about the recipient;

VII. the recognized and acquired electronic signature information about the recipient matching the signature handwriting of the recipient; and VIII. the corresponding code information obtained by decoding the scanned graphic code of the recipient matching the recipient.

Conditions I to VIII are specifically introduced above and will not be described herein redundantly. It needs to be noted that with regard to conditions I to VIII above, they may be selected as required. The verification may be passed when all of them are satisfied, and the verification may also be passed when some of them are satisfied. This can be flexibly selected and is not limited.

The method for delivering cargo with an unmanned aerial vehicle provided in this embodiment is applied in an unmanned aerial vehicle. By using a pre-set condition, acquiring verification information about a recipient, comparing same with the pre-set condition, and determining that verification is passed when the verification information is consistent with the pre-set condition to unlock cargo, false claim or loss of the cargo is avoided, thereby improving the security of cargo transportation.

With regard to a method of comparing location coordinates, the present disclosure herein provides an implementation method embodiment, specifically:

when the coordinates of the current location of the unmanned aerial vehicle are consistent with the coordinates of the pre-determined location of the recipient, the method comprising:

if the difference value between the coordinates of the current location of the unmanned aerial vehicle and the coordinates of the pre-determined location of the recipient is within a pre-set threshold value range, then the coordinates of the current location of the unmanned aerial vehicle are consistent with the coordinates of the pre-determined location of the recipient, wherein the threshold value range is an allowed coordinate deviation. This may help overcome the difficulty in accurately positioning the location of the recipient due to low positioning precision, which may result in delayed landing of the unmanned aerial vehicle, thereby improving the cargo delivery efficiency.

Figure 2:
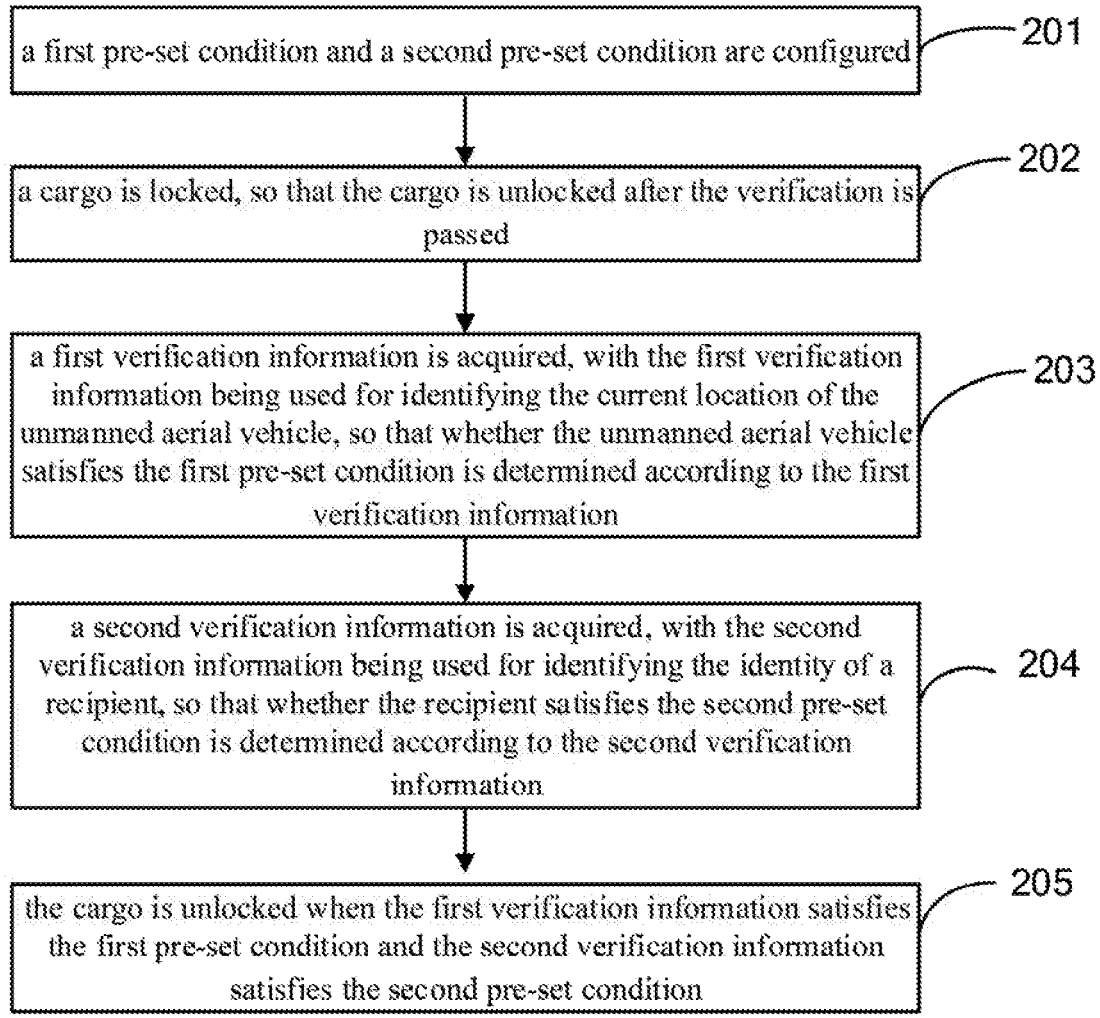
FIG. 2 is a flow chart of another embodiment of a method for delivering cargo with an unmanned aerial vehicle according to the present disclosure.

A method for securely delivering cargo is introduced above. In combination with what is shown in FIG. 2, the present disclosure provides an embodiment of another method for delivering cargo with an unmanned aerial vehicle, the method comprising:

201, a first pre-set condition and a second pre-set condition are configured.

The first pre-set condition comprises at least one of the coordinates of a pre-determined location of the recipient, an environment picture of a landing site of the unmanned aerial vehicle taken in advance, and a guide signal sent by the recipient. The first pre-set condition may verify arrival location of the unmanned aerial vehicle. When the unmanned aerial vehicle arrives at the location of the recipient, identity verification will also need to be performed on the recipient.

The second pre-set condition comprises at least one of a guide signal sent by the recipient, identity information about the recipient, biological recognition information about the recipient, voice print information about the recipient, signature handwriting of the recipient, and a graphic code correspondingly generated according to information about the recipient. The second pre-set condition is to verify the identity of the recipient. Unlocking may be performed only when both the location coordinates and the recipient both pass the verification.

The recipient may be a user who signs for receiving the cargo or an agent who is responsible for signing committed by the user, and a robot may also be used for automatic signing, which can be flexibly selected as required and will not be limited.

With regard to the coordinates of a pre-determined location of the recipient, it may be address information input by the user when buying the cargo, wherein the address information may comprise the coordinates of a location where the user receives the cargo, e.g. GPS coordinates, and Beidou positioning coordinates may also be used. With regard to the location coordinates, various positioning techniques in existing technology may be used, as long as they can accurately identify the receiving address of the recipient, i.e. a cargo delivery destination of the unmanned aerial vehicle, and what kind of positioning system is used is not limited.

The environment picture of a landing site of the unmanned aerial vehicle taken in advance may be an environment picture of a landing site taken in advance at a place where the recipient receives the cargo, i.e. a landing site of the unmanned aerial vehicle, and the environment picture should include a static object so that the unmanned aerial vehicle flies near the landing site via techniques such as cruising, then performs matching according to the environment picture and accurately lands at a specified unmanned aerial vehicle landing site. With regard to the unmanned aerial vehicle image matching and positioning technique, which should be understood by those skilled in the art, various technique may be used, as long as they satisfy the condition that the unmanned aerial vehicle can accurately land at a specified landing site according to a landing site picture taken in advance. This will not be introduced in detail herein.

The guide signal sent by the recipient may be a method whereby the recipient emits electromagnetic waves, e.g. infrared rays, or laser beams, to the unmanned aerial vehicle when the unmanned aerial vehicle flies over a certain range above the location of the recipient. The unmanned aerial vehicle flies to the location of the recipient according to the guidance of the electromagnetic waves. The methods with which the infrared rays guide the unmanned aerial vehicle to land or the laser beams guide the unmanned aerial vehicle to land should be understood by those skilled in the art and will not be specifically described herein redundantly.

The identity information about the recipient may be personal identity information about the recipient, e.g. identity card information, social insurance card information, etc. The identity information about a card holder is acquired by scanning a relevant certificate, and whether he/she is the recipient is determined according to a comparison between the identity information and pre-set identity information. Various techniques may be used for determining whether he/she is the recipient via identity information, which will not be specifically limited.

The biological recognition information about the recipient is used to recognize whether he/she is a real recipient. The recipient's biological recognition feature has uniqueness, and the biological recognition feature of every one is different, thus whether he/she is a real recipient may be determined by acquiring the recipient's biological recognition feature. For example, it can be determined by storing fingerprint information or iris information about the recipient in advance, this information may be uploaded by the recipient in advance, and the unmanned aerial vehicle determines whether he/she is a real recipient by scanning a fingerprint or iris when verifying the recipient, and then comparing the fingerprint or iris with the pre-stored fingerprint information or iris information. With regard to biological recognition techniques, those skilled in the art should understand, which will not be described herein redundantly.

The voice print information about the recipient is used to determine whether the recipient is a real recipient. The specific process may be that the recipient uploads in advance a voice or voice print information obtained after voice processing, when the recipient uploads a voice, the voice may be processed to obtain corresponding voice print information and then the voice print information is stored. The voice print information may be saved in the unmanned aerial vehicle for direct comparison; alternatively the voice may also be processed by remotely calling an API interface to obtain voice print information, or the voice may be sent for remote processing and comparison, the unmanned aerial vehicle is notified of the comparison result, and whether he/she is a real recipient is recognized via the voice print. With regard to the specific implementation steps of voice print recognition, these should be understood by those skilled in the art, and will not be described herein redundantly.

The signature handwriting of the recipient is pre-set. The recipient uploads his/her own signature handwriting in advance and then signs during recipient verification. By scanning the signature and comparing with the signature handwriting uploaded in advance, if the handwriting is consistent, it is determined that he/she is a real recipient, thus a subsequent operation is carried out, e.g. unlocking. With regard to the comparison of handwriting and how to determine whether the two sets of handwriting are consistent, these will not be described herein redundantly.

The information about the recipient, e.g. an account name, or other identity information, may be processed via graphic encoding. For example, the information about the recipient may be generated into a two-dimensional code or a bar code, and other graphic codes may also be generated. Corresponding code information is obtained by scanning and processing these graphic codes, whether this code information is consistent with the information about the recipient is determined, and if so, then it is confirmed that he/she is a real recipient. With regard to how to generate the information about the recipient into a graphic code, this should be understood by those skilled in the art and will not be limited.

It needs to be noted that the pre-set condition may be stored in the unmanned aerial vehicle. Alternatively, information such as the pre-set condition may also be stored in a ground station via the unmanned aerial vehicle. The ground station performs data exchange communications with the unmanned aerial vehicle. The ground station may be connected to the Internet. The recipient may upload information required for a pre-set condition via the Internet, for example, a user is shopping on-line, and uploads information about a pre-set condition, e.g. fingerprint information or iris information, or voice print information, into a website database while shopping; the website database performs data exchange with the ground station; the ground station may save the data locally and may also configure the data in a storage system of the unmanned aerial vehicle; and the unmanned aerial vehicle verifies the recipient using the pre-set condition.

202, cargo is locked, so that the cargo is unlocked after the verification is passed.

Cargo to be transported is loaded on the unmanned aerial vehicle, and a security lock is used for locking the cargo. A recipient without being verified cannot use any legal means to open the security lock. The security lock should satisfy the requirements of preventing malicious entry, and high reliability, and the specific thereof structure is not limited.

With regard to a locking timing of the cargo by the unmanned aerial vehicle, two implementation method embodiments are described herein: automatically locking the cargo when the unmanned aerial vehicle takes off, i.e. automatically locking the cargo after the unmanned vehicle takes off to prevent the cargo from falling off, which can avoid the occurrence of cargo falling during the flight of the unmanned aerial vehicle resulting from forgetting to lock the cargo due to negligence; or manually locking the cargo before the unmanned aerial vehicle takes off, so that the cargo is in a locked state during the flight of the unmanned aerial vehicle. The locking timing may be flexibly selected, which may help to simplify the structure of the security lock and reduce the failure rate.

203, first verification information is acquired, with the first verification information being used for identifying the current location of the unmanned aerial vehicle, so that whether the unmanned aerial vehicle satisfies the first pre-set condition is determined according to the first verification information.

In acquiring the first verification information, the step of acquiring the first verification information may comprise at least one of the following:

I. the coordinates of the current location of the unmanned aerial vehicle are acquired. A positioning system may be installed on the unmanned aerial vehicle, wherein the positioning system may be selected as a GPS system (global positioning system) or a Beidou navigation satellite system, and other systems may also be used. The positioning system records the coordinates of the current location in real time, may compare the current location with predetermined location coordinates of the recipient, and may transmit same back to the ground station and use the ground station to conduct comparison. Different techniques may be used, as long as the coordinates of the location of the unmanned aerial vehicle can be compared with the coordinates of a pre-set location of the recipient.

II. An environment picture of a landing site of the unmanned aerial vehicle is taken. After arriving above the location of the recipient, the unmanned aerial vehicle takes a photo of the ground environment and saves the environment picture and compares it with a pre-set environment picture of the recipient to determine whether is arrives at the environment of the recipient. Unlocking may be performed after it is determined that it has arrived at the environment of the recipient.

III. A guide signal sent by the recipient is received. The unmanned aerial vehicle receives the guide signal sent by the recipient, flies to the location of the recipient according to the guide signal and lands, and after arrival is determined, unlocking may be performed.

One premise of performing unlocking is that the first verification information satisfies the first pre-set condition, and the first verification information may be selected according to the first pre-set condition and is not limited.

204, second verification information is acquired, with the second verification information being used for identifying the identity of a recipient, so that whether the recipient satisfies the second pre-set condition is determined according to the second verification information.

The step of acquiring the second verification information about the recipient may comprise at least one of the following:

I. Identity recognition card information about the recipient is read. After the unmanned aerial vehicle lands, by scanning the identity recognition card of the recipient, wherein the identity recognition card may be sensed and recognized via a sensor mounted on the body of the unmanned aerial vehicle, the information about the identity recognition card is read.

In some embodiments, the identity recognition card of the recipient comprises at least one of a second generation identity card, a social insurance card, a housing funds card, a passport, and a pass card, and certainly there may also be other identity recognition cards, which will not be limited.

II. A biological recognition feature of the recipient is scanned. A biological recognition feature of the recipient is scanned via a biological recognition instrument, the biological recognition feature of the recipient, e.g. fingerprint information, iris information or a facial profile, is acquired, and then these biological recognition features are compared with pre-set biological recognition information to verify the recipient.

In some embodiments, the biological recognition information comprises fingerprint information about the recipient and/or iris information about the recipient, and the biological recognition feature is a fingerprint of the recipient and/or an iris of the recipient; matching and verification are performed by scanning the fingerprint and/or iris of the recipient and comparing them with the pre-set fingerprint information about the recipient and/or iris information about the recipient.

III. Voice input by the recipient is received and processed to obtain corresponding voice print information. The voice of the recipient who is to sign is recorded via a sound recording device mounted on the unmanned aerial vehicle, and then the voice is processed to obtain voice print information corresponding to the voice. How to process voice to obtain voice print information should be understood by those skilled in the art and will not be described herein redundantly. Various techniques may be used, as long as the condition of recognizing a recipient via voice print information is satisfied.

It needs to be noted that verification may also be performed by directly using a voice command. For example, a command for signing is pre-set, commands are compared when a recipient signs, and if the commands are consistent, the verification is passed. For example, a command "hello" is pre-set, when the recipient speaks "hello" when the recipient, the commands are consistent and the verification is passed. The specific content of the command may be set as required, as long as it ensures confidentiality, which will not be specifically limited.

IV. Electronic signature information about the recipient is recognized and acquired. A touch panel or a camera may be additionally mounted on the unmanned aerial vehicle; the recipient signs on the touch panel and an electronic signature is obtained after processing; or the recipient writes a signature on paper, the camera takes a photo of the signature and obtains an electronic version of the signature by processing the photo. The electronic signature or the electronic version of the signature may be compared with handwriting stored in advance, so as to determine the identity of the recipient.

V. A graphic code of the recipient is scanned and decoded to obtain corresponding code information. A radio frequency tool or a camera may be additionally mounted on the unmanned aerial vehicle, and the graphic code provided by the recipient is scanned, for example, by scanning a bar code via the radio frequency tool, or scanning a two-dimensional code via the camera, as long as the instrument obtains the information of the graphic code.

In some embodiments, the graphic code comprises a two-dimensional code or a bar code, and certainly other forms of graphic codes may be used, which will not be specifically limited.

205, the cargo is unlocked when the first verification information satisfies the first pre-set condition and the second verification information satisfies the second pre-set condition.

With regard to the first verification information satisfying the first pre-set condition, if one of the following conditions is satisfied, then the first verification information satisfies the first pre-set condition:

the coordinates of the current location of the unmanned aerial vehicle being consistent with the coordinates of the pre-determined location of the recipient; or the environment picture taken for the landing site of the unmanned aerial vehicle matching the environment picture of the landing site of the unmanned aerial vehicle taken in advance, or having received the guide signal of the recipient, and landing at a specified place according to the guide signal.

With regard to second verification information satisfying the second pre-set condition, if one of the following conditions is satisfied, then the second verification information satisfies the second pre-set condition: the information obtained by reading the identity recognition card of the recipient being consistent with the identity information about the recipient, or the scanned biological recognition feature of the recipient matching the biological recognition information about the recipient; the corresponding voice print information obtained by processing the received voice input by the recipient being consistent with the voice print information about the recipient; the recognized and acquired electronic signature information about the recipient matching the signature handwriting of the recipient; and the corresponding code information obtained by decoding the scanned graphic code of the recipient matching the recipient.

With regard to a determination order of the first pre-set condition and the second pre-set condition, here are two implementation method embodiments, which will be introduced specifically below:

I. after the first verification information satisfies the first pre-set condition, whether the second verification information satisfies the second pre-set condition is determined. After the first verification information satisfies the first pre-set condition, i.e. the unmanned aerial vehicle arrives at the location of the recipient, then the identity of the recipient needs to be verified; and after the second verification information about the recipient has passed verification, then the cargo can be unlocked, which improves the transportation security of the cargo; and II. after the second verification information satisfies the second pre-set condition, whether the first verification information satisfies the first pre-set condition is determined. If the second verification information satisfies the second pre-set condition, namely, the identity information verification of the recipient has passed; and the unmanned aerial vehicle needs to arrive at a specified recipient location, then unlocking can be performed. This avoids hijacking of the unmanned aerial vehicle on the way wherein the hijacker forging the recipient information for verification, thus improving the security of cargo transportation and improves the accuracy.

With regard to a method of comparing location coordinates, the present disclosure provides an implementation method embodiment, specifically:

With regard to the coordinates of the current location of the unmanned aerial vehicle being consistent with the coordinates of the pre-determined location of the recipient, the method comprising: if the difference value between the coordinates of the current location of the unmanned aerial vehicle and the coordinates of the pre-determined location of the recipient is within a pre-set threshold value range, then the coordinates of the current location of the unmanned aerial vehicle are determined to be consistent with the coordinates of the pre-determined location of the recipient, wherein the threshold value range is an allowed coordinate deviation. The difficulty in accurately positioning the location of the recipient due to low positioning precision in existing technology is overcome, and the problem of delayed landing of the unmanned aerial vehicle is solved, thereby improving the cargo delivery efficiency.

Another method embodiment for delivering cargo with an unmanned aerial vehicle provided in the present disclosure requires that the conditions that: an unmanned aerial vehicle lands at a pre-determined recipient location; and identity verification of a recipient is passed, are satisfied at the same time via a first pre-set condition and a second pre-set condition, then cargo can be unlocked, which improves the accuracy of verification and ensures the security of cargo transportation.

Figure 3:
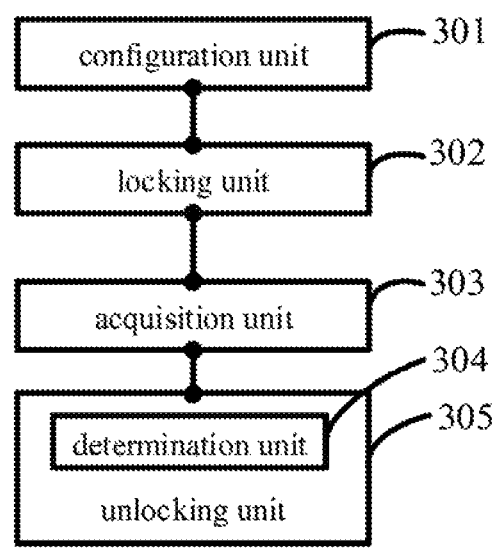
FIG. 3 is a structural schematic diagram of an embodiment of a system for delivering cargo with an unmanned aerial vehicle according to the present disclosure.

Methods for delivering cargo with an unmanned aerial vehicle are described above. As shown in FIG. 3, the present disclosure further provides a system embodiment for delivering cargo with an unmanned aerial vehicle. A system for delivering cargo with an unmanned aerial vehicle is introduced below.

An embodiment of a system for delivering cargo with an unmanned aerial vehicle provided in the present disclosure is applied to an unmanned aerial vehicle, the system comprising:

a configuration unit 301 for configuring a pre-set condition, so that during verification, if a condition satisfies the pre-set condition, then the verification is passed;

a locking unit 302 for locking cargo, so that the cargo is unlocked after the verification is passed;

an acquisition unit 303 for acquiring verification information, with the verification information being used for identifying the identity of a recipient and/or the location of the unmanned aerial vehicle; and an unlocking unit 304 for unlocking the cargo when the verification information satisfies the pre-set condition.

In some embodiments, the pre-set condition comprises: at least one of the coordinates of a pre-determined location of the recipient, an environment picture of a landing site of the unmanned aerial vehicle taken in advance, a guide signal sent by the recipient, identity information about the recipient, biological recognition information about the recipient, voice print information about the recipient, signature handwriting of the recipient, and a graphic code correspondingly generated according to information about the recipient.

In some embodiments, the acquisition unit 303 further comprises at least one of the following sub-units:

a location acquisition sub-unit for acquiring the coordinates of the current location of the unmanned aerial vehicle;

a picture acquisition sub-unit for taking an environment picture of a landing site of the unmanned aerial vehicle;

a guide signal acquisition sub-unit for receiving a guide signal sent by the recipient;

an identity recognition card reading sub-unit for reading identity recognition card information about the recipient;

a biological recognition feature scanning sub-unit for scanning a biological recognition feature of the recipient;

a voice print acquisition sub-unit for receiving a voice input by the recipient and processing same to obtain corresponding voice print information;

an electronic signature recognition and acquisition sub-unit for recognizing and acquiring electronic signature information about the recipient; and a graphic code scanning sub-unit for scanning a graphic code of the recipient and decoding same to obtain corresponding code information.

In some embodiments, the unlocking unit 304 further comprises:

a determination unit 304 for determining that the verification information satisfies the pre-set condition when at least one of the following conditions is satisfied: the coordinates of the current location of the unmanned aerial vehicle being consistent with the coordinates of the pre-determined location of the recipient; the environment picture taken for the landing site of the unmanned aerial vehicle matching the environment picture of the landing site of the unmanned aerial vehicle taken in advance; having received the guide signal of the recipient, and landing at a specified place according to the guide signal; the information obtained by reading the identity recognition card of the recipient being consistent with the identity information about the recipient; the scanned biological recognition feature of the recipient matching the biological recognition information about the recipient; the corresponding voice print information obtained by processing the received voice input by the recipient being consistent with the voice print information about the recipient; the recognized and acquired electronic signature information about the recipient matching the signature handwriting of the recipient; and the corresponding code information obtained by decoding the scanned graphic code of the recipient matching the recipient.

In some embodiments, the determination unit 304 is further used for, if the difference value between the coordinates of the current location of the unmanned aerial vehicle and the coordinates of the pre-determined location of the recipient is within a pre-set threshold value range, then the coordinates of the current location of the unmanned aerial vehicle are determined to be consistent with the coordinates of the pre-determined location of the recipient, wherein the threshold value range is an allowed coordinate deviation.

In some embodiments, the graphic code comprises a two-dimensional code or a bar code.

In some embodiments, the biological recognition information comprises fingerprint information about the recipient and/or iris information about the recipient, and the biological recognition feature is a fingerprint of the recipient and/or an iris of the recipient, so that matching and verification are performed by scanning the fingerprint and/or iris of the recipient and comprising it with the pre-set fingerprint information about the recipient and/or iris information about the recipient.

In some embodiments, the identity recognition card of the recipient comprises at least one of a second generation identity card, a social insurance card, a housing funds card, a passport, and a pass card.

In some embodiments, the locking unit 302 is further used for automatically locking the cargo when the unmanned aerial vehicle takes off, so that the cargo can be unlocked after the verification is passed, or the locking unit 302 is further used for manually locking cargo before the unmanned aerial vehicle takes off, so that the cargo can be unlocked after the verification is passed, and the cargo is in a locked state during the flight of the unmanned aerial vehicle.

The system for delivering cargo with an unmanned aerial vehicle provided in this embodiment is applied in an unmanned aerial vehicle. By configuring in advance, by a configuration unit, a pre-set condition; acquiring, by an acquisition unit, verification information about a recipient; comparing the verification information with the pre-set condition; determining, by a determination unit, that verification is passed when the verification information is consistent with the pre-set condition; and unlocking cargo, by an unlocking unit, false claim or loss of the cargo is avoided, thereby improving the security of cargo transportation.

Method for delivering cargo with an unmanned aerial vehicle are introduced above. With regard to how to implement receipt verification more accurately, a system embodiment for delivering cargo with an unmanned aerial vehicle is correspondingly provided corresponding to a method for delivering cargo with an unmanned aerial vehicle disclosed in the present disclosure, which will be introduced specifically below.

Figure 4:
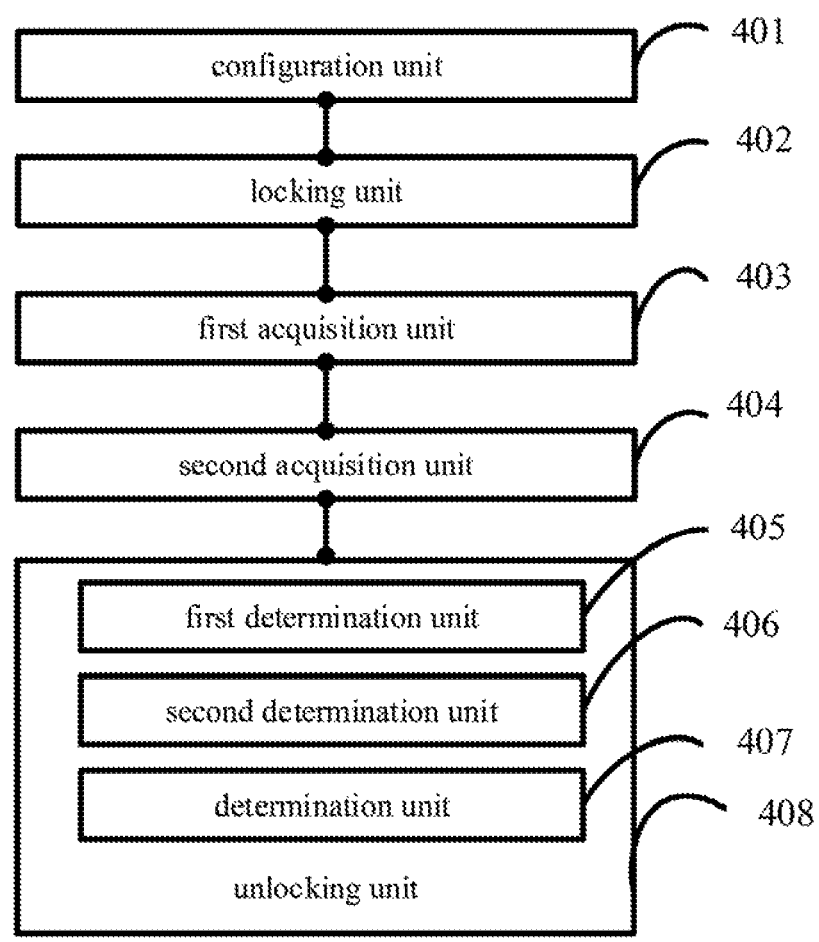
FIG. 4 is a structural schematic diagram of another embodiment of a system for delivering cargo with an unmanned aerial vehicle according to the present disclosure.

With reference to what is shown in FIG. 4, an embodiment of a system for delivering cargo with an unmanned aerial vehicle is provided, the system comprising:

a configuration unit 401 for configuring a first pre-set condition and a second pre-set condition;

a locking unit 402 for locking cargo, so that the cargo is unlocked after the verification is passed;

a first acquisition unit 403 for acquiring first verification information, with the first verification information being used for identifying the location of the unmanned aerial vehicle, so that whether the unmanned aerial vehicle satisfies the first pre-set condition is determined according to the first verification information;

a second acquisition unit 404 for acquiring second verification information, with the second verification information being used for identifying the identity of the recipient, so that whether the recipient satisfies the second pre-set condition is determined according to the second verification information; and an unlocking unit 408 for unlocking the cargo when the first verification information satisfies the first pre-set condition and the second verification information satisfies the second pre-set condition.

In some embodiments, the first pre-set condition comprises at least one of the coordinates of a pre-determined location of the recipient, an environment picture of a landing site of the unmanned aerial vehicle taken in advance, and a guide signal sent by the recipient.

The second pre-set condition comprises at least one of a guide signal sent by the recipient, identity information about the recipient, biological recognition information about the recipient, voice print information about the recipient, signature handwriting of the recipient, and a graphic code correspondingly generated according to information about the recipient.

In some embodiments, the first acquisition unit 403 comprises at least one of the following sub-units:

a location acquisition sub-unit for acquiring the coordinates of the current location of the unmanned aerial vehicle;

a picture acquisition sub-unit for taking an environment picture of a landing site of the unmanned aerial vehicle; and a guide signal acquisition sub-unit for receiving a guide signal sent by the recipient.

In some embodiments, the second acquisition unit 404 comprises at least one of the following sub-units:

an identity recognition card reading sub-unit for reading identity recognition card information about the recipient;

a biological recognition feature scanning sub-unit for scanning a biological recognition feature of the recipient;

a voice print acquisition sub-unit for receiving voice input by the recipient and processing it to obtain corresponding voice print information;

an electronic signature recognition and acquisition sub-unit for recognizing and acquiring electronic signature information about the recipient; and a graphic code scanning sub-unit for scanning a graphic code of the recipient and decoding it to obtain corresponding code information. In some embodiments, the locking unit 402 further comprises:

a first determination unit 405 for determining that the verification information satisfies the pre-set condition when at least one of the following conditions is satisfied:

the coordinates of the current location of the unmanned aerial vehicle being consistent with the coordinates of the pre-determined location of the recipient, or the environment picture taken for the landing site of the unmanned aerial vehicle matching the environment picture of the landing site of the unmanned aerial vehicle taken in advance, or having received the guide signal of the recipient, and landing at a specified place according to the guide signal.

In some embodiments, the system further comprises:

a second determination unit 406 for determining that the verification information satisfies the pre-set condition when at least one of the following conditions is satisfied:

the information obtained by reading the identity recognition card of the recipient being consistent with the identity information about the recipient;

the scanned biological recognition feature of the recipient matching the biological recognition information about the recipient;

the corresponding voice print information obtained by processing the received voice input by the recipient being consistent with the voice print information about the recipient;

the recognized and acquired electronic signature information about the recipient matching the signature handwriting of the recipient; and the corresponding code information obtained by decoding the scanned graphic code of the recipient matching the recipient.

In some embodiments, the locking unit 402 further comprises:

a determination unit 407 for, when the first verification information satisfies the first pre-set condition, determining whether the second verification information satisfies the second pre-set condition; or when the second verification information satisfies the second pre-set condition, determining whether the first verification information satisfies the first pre-set condition, so as to notify the unlocking unit to unlock when the first pre-set condition and the second pre-set condition are both satisfied.

In some embodiments, when the coordinates of the current location of the unmanned aerial vehicle are consistent with the coordinates of the pre-determined location of the recipient, the system comprises:

if the difference value between the coordinates of the current location of the unmanned aerial vehicle and the coordinates of the pre-determined location of the recipient is within a pre-set threshold value range, then the coordinates of the current location of the unmanned aerial vehicle are determined to be consistent with the coordinates of the pre-determined location of the recipient, wherein the threshold value range is an allowed coordinate deviation.

In some embodiments, the graphic code comprises a two-dimensional code or a bar code.

In some embodiments, the biological recognition information comprises fingerprint information about the recipient and/or iris information about the recipient, and the biological recognition feature is a fingerprint of the recipient and/or an iris of the recipient, so that matching and verification are performed by scanning the fingerprint and/or iris of the recipient and comparing them with the pre-set fingerprint information about the recipient and/or iris information about the recipient.

In some embodiments, the identity recognition card of the recipient comprises at least one of a second generation identity card, a social insurance card, a housing funds card, a passport, and a pass card.

In some embodiments, the locking unit 402 is further used for automatically locking cargo when the unmanned aerial vehicle takes off, so that the cargo is unlocked after the verification is passed, or the locking unit 402 manually locks cargo before the unmanned aerial vehicle takes off, so that the cargo is unlocked after the verification is passed, so that the cargo is in a locked state during the flight of the unmanned aerial vehicle.

Another system embodiment for delivering cargo with an unmanned aerial vehicle is provided in the present disclosure, wherein by pre-setting, by a configuration unit, a first pre-set condition and a second pre-set condition, requires that the conditions that an unmanned aerial vehicle lands at a pre-determined recipient location and identity verification of a recipient is passed are satisfied at the same time, then an unlocking unit can unlock cargo, which improves the accuracy of verification and ensures the security of cargo transportation.

Figure 5:
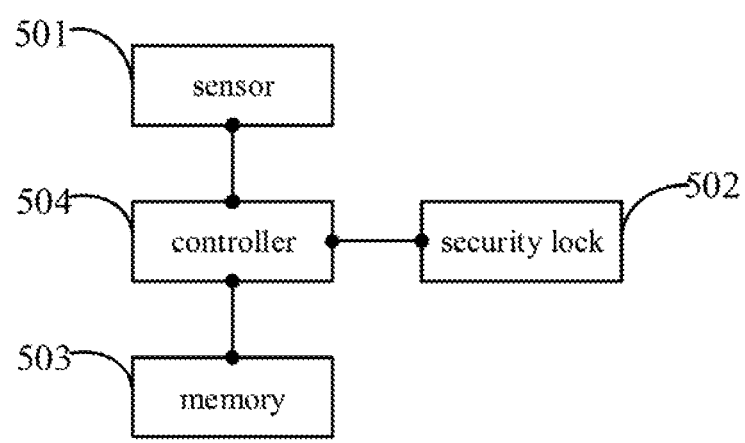
FIG. 5 is a structural schematic diagram of an embodiment of an unmanned aerial vehicle according to the present disclosure.

In combination with what is shown in FIG. 5, the present disclosure further provides an embodiment of an unmanned aerial vehicle, the unmanned aerial vehicle comprising:

a sensor 501 for recognizing verification information, wherein the verification information comprises information about a recipient or information about the unmanned aerial vehicle;

a security lock 502 for locking cargo, so that the cargo is unlocked after the verification is passed, wherein the security lock 502 may be an electronic lock to control locking or unlocking according to an electronic signal, which is not limited specifically;

a memory 503 for storing pre-set unlocking information, which is mounted on the unmanned aerial vehicle and may be apparatuses storing information such as a flash memory, a solid-state hard disk, an SD card, a TF card, which is not limited specifically; and a controller 504 communicatively connected to the sensor 501, the security lock 502, and the memory 503, respectively, wherein the controller 504 is a processing chip which can not only be used for processing verification information collected by the sensor, but is also used for receiving a control command and executing a flying operation, e.g. control the operation of a flying control unit, which is not limited specifically.

In some embodiments, the sensor 501 comprises at least one of the following: a location sensor, an identity recognition sensor, an electronic signature recognition sensor, and a graphic code recognition sensor.

In some embodiments, the electronic signature recognition sensor comprises a biological feature recognition sensor, and an image recognition sensor for recognizing a handwritten signature or a seal.

With regard to the image recognition sensor for recognizing a handwritten signature or a seal, the signature handwriting of the recipient may be pre-set. The recipient uploads his/her own signature handwriting and signs during recipient verification. By scanning the signature and comparing it with the signature handwriting uploaded in advance, if the handwriting is consistent, it is determined that he/she is a real recipient, and thus a subsequent operation is carried out, e.g. unlocking. With regard to the comparison of handwriting and how to determine that the two sets of handwriting are consistent, these will not be described redundantly.

The biological recognition information about the recipient is used to recognize whether he/she is a real recipient. The recipient's biological recognition feature has uniqueness, and the biological recognition feature of every one is different, and thus whether he/she is a real recipient may be determined by acquiring the recipient's biological recognition feature. For example, it can be determined by storing fingerprint information or iris information about the recipient in advance, this information may be uploaded by the recipient in advance, and the unmanned aerial vehicle determines whether he/she is a real recipient by scanning a fingerprint or iris when verifying the recipient, and then comparing the fingerprint or iris with the pre-stored fingerprint information or iris information. With regard to biological recognition techniques, those skilled in the art should understand, which will not be described redundantly.

In some embodiments, the biological feature recognition sensor comprises at least one of the following:

a fingerprint recognition sensor for recognizing fingerprint information about the recipient and transmitting the fingerprint information to the controller;

an iris recognition sensor for recognizing iris information about the recipient and transmitting the iris information to the controller;

a human face recognition sensor for recognizing facial profile information about the recipient and transmitting the facial profile information to the controller; and a voice recognition sensor for recognizing voice print information about the recipient and transmitting the voice print information to the controller.

The voice print information about the recipient may be used to determine whether the recipient is a real recipient. The specific process may be that the recipient uploads in advance a voice or voice print information obtained after voice processing, when the recipient uploads a voice, the voice may be processed to obtain corresponding voice print information and then the voice print information is saved, wherein the voice print information may be directly saved in the unmanned aerial vehicle and used for comparison. Alternatively, the voice may also be processed by remotely calling an API interface to obtain voice print information, or the voice is sent for remote processing and comparison, the unmanned aerial vehicle is notified of the comparison result, and whether he/she is a real recipient is recognized via the voice print. With regard to the specific implementation steps of voice print recognition, these should be understood by those skilled in the art, and will not be described redundantly.

In some embodiments, the location sensor comprises at least one of the following:

a GPS for recognizing the current location of the unmanned aerial vehicle, wherein with regard to the coordinates of a pre-determined location of the recipient, it may be address information input by the user when buying the cargo, wherein the address information may comprise the coordinates of a location where the user receives the cargo, e.g. GPS coordinates, and Beidou positioning coordinates may also be used. With regard to the location coordinates, various positioning techniques in existing technology may be used, as long as they can accurately identify the receiving address of the recipient, i.e. cargo delivery destination of the unmanned aerial vehicle. What kind of positioning system is used is not limited;

an image sensor for recording information about an environment picture corresponding to the unmanned aerial vehicle, wherein the environment picture of a landing site of the unmanned aerial vehicle taken in advance may be an environment picture of a landing site taken in advance at a place where the recipient receives the cargo, i.e. a landing site of the unmanned aerial vehicle, and the environment picture should include a static object so that the unmanned aerial vehicle flies near the landing site via techniques such as cruising, then performs matching according to the environment picture and accurately lands at a specified unmanned aerial vehicle landing site. Various image matching and positioning techniques may be used, which should be understood by those skilled in the art, as long as they satisfy the condition that the unmanned aerial vehicle can accurately land at a specified landing site for landing according to a landing site picture taken in advance. Specific techniques will not be introduced in detail herein; and a wireless signal receiver for receiving a guide signal of the recipient, wherein using the guide signal sent by the recipient may be a method whereby the recipient emits electromagnetic waves, e.g. infrared rays, or laser beams, to the unmanned aerial vehicle when the unmanned aerial vehicle flies over a certain range above the location of the recipient, and the unmanned aerial vehicle flies to the location of the recipient according to the guidance of the electromagnetic waves. Techniques with which the infrared rays guide the unmanned aerial vehicle to land or the laser beams guide the unmanned aerial vehicle to land should be understood by those skilled in the art and will not be specifically described herein redundantly.

In some embodiments, the identity recognition sensor comprises at least one of the following:

a radio frequency identification sensor for reading a radio frequency card which records information about the recipient, and a magnetic card reader for reading a magnetic strip card which records the information about the recipient.

The identity information about the recipient may be personal identity information about the recipient, e.g. identity card information, social insurance card information, etc. The identity information about a card holder is acquired by scanning a relevant certificate, and whether he/she is the recipient is determined according to a comparison between the identity information and pre-set identity information. Various techniques may be used to determine whether he/she is the recipient via identity information, which will not be specifically limited.

In some embodiments, the graphic code recognition sensor comprises at least one of the following:

a bar code reader for reading a bar code correspondingly generated according to the information about the recipient, and a two-dimensional code reader for reading a two-dimensional code correspondingly generated according to the information about the recipient.

The information about the recipient, e.g. an account name, or other identity information, may be processed via graphic encoding, for example, the information about the recipient may be generated into a two-dimensional code or a bar code, and other graphic codes may also be generated. Corresponding code information is obtained by scanning and processing these graphic codes, whether this code information is consistent with the information about the recipient is determined, and if so, then it is confirmed that he/she is a real recipient. With regard to how to generate the information about the recipient into a graphic code, this should be understood by those skilled in the art and will not be limited.

The sensor transmits the acquired verification information to the controller, and the controller controls that the security lock unlocks the cargo when the verification information matches the pre-set unlocking information.

The verification information matching the pre-set unlocking information may mean the verification information passes verification, and the security lock may perform an unlocking operation.

The pre-set unlocking information may be at least one of the coordinates of a pre-determined location of the recipient, an environment picture of a landing site of the unmanned aerial vehicle taken in advance, a guide signal sent by the recipient, identity information about the recipient, biological recognition information about the recipient, voice print information about the recipient, signature handwriting of the recipient, and a graphic code correspondingly generated according to information about the recipient. A user may select a variety of pre-set conditions for verification as required. The more pre-set conditions, the higher the verification accuracy. Certainly, the more pre-set conditions are set, the more response verification processes need to be conducted. The user may make flexible selection without limitations as required. With regard to the pre-set conditions, they may be other ways, for example, a command or a password may be pre-set. The recipient may be verified when a password matches a pre-set condition. Various techniques may be used, as long as it is convenient for verifying the recipient, which will not be enumerated exhaustively.

The recipient may be a user who signs for receiving the cargo or an agent who is responsible for signing committed by the user. A robot may also be used for automatic signing. Different manners can be flexibly selected as required and will not be limited.

It needs to be noted that the pre-set condition may be saved in the unmanned aerial vehicle, and information such as the pre-set condition may also be saved in a ground station via the unmanned aerial vehicle. The ground station performs data exchange communications with the unmanned aerial vehicle. The ground station is connected to the Internet. The recipient may upload information required for a pre-set condition via the Internet, for example, a user is shopping on-line, and uploads information about a pre-set condition, e.g. fingerprint information or iris information, or voice print information, into a website database while shopping; the website database performs data exchange with the ground station; the ground station may save the data locally and may also configure the data in a storage system of the unmanned aerial vehicle; and the unmanned aerial vehicle verifies the recipient using the pre-set condition.

The controller controls that the security lock to unlock the cargo when the verification information matches the pre-set unlocking information. The unlocking condition for the security lock may be: I. the coordinates of the current location of the unmanned aerial vehicle being consistent with the coordinates of the pre-determined location of the recipient; II. the environment picture taken for the landing site of the unmanned aerial vehicle matching the environment picture of the landing site of the unmanned aerial vehicle taken in advance; III. having received the guide signal of the recipient, and landing at a specified place according to the guide signal; IV. the information obtained by reading the identity recognition card of the recipient being consistent with the identity information about the recipient; V. the scanned biological recognition feature of the recipient matching the biological recognition information about the recipient; VI. the corresponding voice print information obtained by processing the received voice input by the recipient being consistent with the voice print information about the recipient; VII. the recognized and acquired electronic signature information about the recipient matching the signature handwriting of the recipient; and VIII. the corresponding code information obtained by decoding the scanned graphic code of the recipient matching the information about the recipient.

Conditions I to VIII have been described above and will not be described herein redundantly. It needs to be noted that with regard to conditions I to VIII above, they may be selected or combined as required. The verification may be passed when all of them are satisfied, and the verification may also be passed when some of them are satisfied. This can be flexibly selected and is not limited.

In some embodiments, the unmanned aerial vehicle of the present disclosure further comprises other mechanisms for enabling the unmanned aerial vehicle to fly, for example, a flying control unit, a battery, etc., which should be understood by those skilled in the art and will not be described herein redundantly.

The unmanned aerial vehicle provided in the present disclosure comprises a sensor, a security lock, a memory and a controller. The sensor transmits the acquired verification information to the controller, the controller controls that the security lock to unlock the cargo when the verification information matches the pre-set unlocking information, and the cargo is unlocked when it is determined that the verification is passed. False claim or loss of the cargo can be avoided, thereby improving the security of cargo transportation. Those skilled in the art should clearly understand that, for the convenience and brevity of description, the specific operating processes of the systems, apparatuses, and units above, one may refer to the corresponding processes in the preceding method embodiments, which will not be described redundantly herein.

In the several embodiments provided in the present application, it should be understood that the disclosed system, apparatus, and method may be implemented in other ways. For example, the apparatus embodiments described above are merely illustrative. Further, the division of units is merely a logical function division, and there may be other division methods in actual implementation, for example, a plurality of units or components may be combined or may be integrated into another system, or some features may be omitted or not executed. In another aspect, the coupling, direct coupling, or communicative connection therebetween which is described or discussed may be indirect coupling or communicative connection via interfaces, apparatuses, or units, and may be electrical, mechanical, or in other forms.

The units described as separate parts may or may not be physically separate, and parts described as units may or may not be physical units, that is, may be located in one place, or may also be distributed on multiple network elements. Some or all of the units may be selected according to actual needs to achieve the objectives of the solutions of the embodiments.

In addition, various functional units in various embodiments of the present disclosure may be integrated into one processing unit, or each of the units may exist alone physically, or two or more units may be integrated into a unit. The integrated unit may be implemented in the form of hardware, or may be implemented in the form of a software functional unit.

Those skilled in the art shall understand that some or all steps in various methods described in the embodiments above may be accomplished by a program instructing relevant hardware to perform certain steps. The program can be stored in a computer-readable storage medium. The storage medium may include: a read only memory (ROM), a random access memory (RAM), a magnetic disk, or an optical disk, etc.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A delivering method using an unmanned aerial vehicle, comprising:
    configuring a first pre-set condition based on one or more conditions selected by a recipient from a first group of conditions, the first group of conditions including coordinates of a pre-determined location of the recipient, a pre-taken environment picture of a landing site of the unmanned aerial vehicle, and a pre-set guide signal;
    configuring a second pre-set condition based on one or more conditions selected by the recipient from a second group of conditions, the second group of conditions including pre-set biological recognition information of the recipient, pre-set voice print information of the recipient, a signature of the recipient, and a pre-set graphic code generated according to information about the recipient;
    locking, using an electronic security lock, a cargo loaded on the unmanned aerial vehicle;
    acquiring first verification information that indicates a current location of the unmanned aerial vehicle, and determining whether the first verification information satisfies the first pre-set condition;
    upon determining that the first verification information satisfies the first pre-set condition, acquiring second verification information that indicates an identify of the recipient, and determining whether the second verification information satisfies the second pre-set condition; and
    in response to determining that the first verification information satisfies the first pre-set condition and determining that the second verification information satisfies the second pre-set condition, unlocking the cargo by opening the electronic security lock.

2. The method according to claim 1, wherein:
    acquiring the first verification information includes at least one of:
        acquiring coordinates of the current location of the unmanned aerial vehicle;
        taking an environment picture of the landing site of the unmanned aerial vehicle; or
        receiving a guide signal sent by the recipient; and
    acquiring the second verification information includes at least one of:
        reading an identity recognition card of the recipient;
        scanning a biological recognition feature of the recipient;
        receiving a voice input from the recipient and processing the voice to obtain corresponding voice print information;
        recognizing and acquiring electronic signature information of the recipient; or
        scanning a graphic code provided by the recipient and decoding the graphic code to obtain corresponding code information.

3. The method according to claim 2, wherein:
determining whether the first verification information satisfies the first pre-set condition includes at least one of:
   determining whether the coordinates of the current location of the unmanned aerial vehicle are consistent with the coordinates of the pre-determined location of the recipient;
   determining whether the environment picture of the landing site of the unmanned aerial vehicle matches the pre-taken environment picture of the landing site of the unmanned aerial vehicle; or
   determining whether the received guide signal matches the pre-set guide signal and the unmanned aerial vehicle lands at a specified place according to the received guide signal; and
determining whether the second verification information satisfies the second pre-set condition includes at least one of:
   determining whether information obtained by reading the identity recognition card of the recipient is consistent with the pre-set identity information of the recipient;
   determining whether the scanned biological recognition feature of the recipient matches the pre-set biological recognition information of the recipient;
   determining whether the corresponding voice print information obtained by processing the received voice from the recipient is consistent with the pre-set voice print information of the recipient;
   determining whether the recognized and acquired electronic signature information of the recipient matches the signature of the recipient; or
   determining whether the corresponding code information obtained by decoding the scanned graphic code provided by the recipient matches the information of the recipient stored in the pre-set graphic code.

4. The method according to claim 3, wherein:
determining whether the coordinates of the current location of the unmanned aerial vehicle are consistent with the coordinates of the pre-determined location of the recipient includes determining whether a difference between the coordinates of the current location of the unmanned aerial vehicle and the coordinates of the pre-determined location of the recipient is within a pre-set threshold value range, the threshold value range being an allowed coordinate deviation;
the graphic code comprises a two-dimensional code or a bar code;
the biological recognition information comprises at least one of fingerprint information of the recipient or iris information of the recipient, and the biological recognition feature is at least one of a fingerprint of the recipient or an iris of the recipient; and
the identity recognition card of the recipient comprises at least one of a second generation identity card, a social insurance card, a housing funds card, a passport, or a pass card.

5. The method according to claim 1, wherein locking the cargo comprises automatically locking the cargo when the unmanned aerial vehicle takes off or manually locking the cargo before the unmanned aerial vehicle takes off.

6. A delivering method using an unmanned aerial vehicle, comprising:
configuring a first pre-set condition based on one or more conditions selected by a recipient from a first group of conditions, and configuring a second pre-set conditions based on one or more conditions selected by the recipient from a second group of conditions;
locking, using an electronic security lock, a cargo loaded on the unmanned aerial vehicle;
acquiring first verification information, the first verification information identifying a current location of the unmanned aerial vehicle;
determining whether the first verification information satisfies the first pre-set condition;
in response to the first verification information satisfies the first pre-set condition, determining that the unmanned aerial vehicle arrives at a location of the recipient;
in response to determining that the unmanned aerial vehicle arrives at the location of the recipient, acquiring second verification information identifying an identity of the recipient and determining whether the second verification information satisfies the second pre-set condition, the second verification information including one or more of biological recognition information of the recipient and a signature of the recipient, the biological recognition information including one or more of a fingerprint scan, an iris scan, and a facial feature profile;
in response to the second verification information satisfying the second pre-set condition, determining that an identity of the recipient is verified; and
in response to the unmanned aerial vehicle arriving at the location of the recipient and the identity of the recipient being verified, unlocking the cargo by opening the electronic security lock when the first verification information satisfies the first pre-set condition and the second verification information satisfies the second pre-set condition.

7. The method according to claim 6, wherein:
the first group of conditions include: coordinates of a pre-determined location of the recipient, a pre-taken environment picture of a landing site of the unmanned aerial vehicle, and a pre-set guide signal; and
the second group of conditions include: pre-set identity information of the recipient, pre-set biological recognition information of the recipient, pre-set voice print information of the recipient, a signature of the recipient, and a pre-set graphic code generated according to information about the recipient.

8. The method according to claim 7, wherein:
acquiring the first verification information comprises at least one of:
   acquiring coordinates of the current location of the unmanned aerial vehicle,
   taking an environment picture of the landing site of the unmanned aerial vehicle, or
   receiving a guide signal sent by the recipient; and
acquiring the second verification information comprises at least one of:
   reading an identity recognition card of the recipient,
   scanning a biological recognition feature of the recipient,
   receiving a voice input from the recipient and processing the voice to obtain corresponding voice print information,
   recognizing and acquiring electronic signature information of the recipient, or
   scanning a graphic code provided by the recipient and decoding same to obtain corresponding code information.

9. The method according to claim 8, wherein:
the first verification information is determined to satisfy the first pre-set condition when at least one of following conditions is satisfied:
the coordinates of the current location of the unmanned aerial vehicle are consistent with the coordinates of the pre-determined location of the recipient,
the environment picture of the landing site of the unmanned aerial vehicle matches the pre-taken environment picture of the landing site of the unmanned aerial vehicle, and
the received guide signal matches the pre-set guide signal and the unmanned aerial vehicle lands at a specified place according to the guide signal; and
the second verification information is determined to satisfy the second pre-set condition when at least one of following conditions is satisfied:
the information obtained by reading the identity recognition card of the recipient is consistent with the pre-set identity information of the recipient,
the scanned biological recognition feature of the recipient matching the biological recognition information about the recipient,
the corresponding voice print information obtained by processing the received voice from the recipient is consistent with the pre-set voice print information of the recipient,
the recognized and acquired electronic signature information of the recipient matches the signature of the recipient, and
the corresponding code information obtained by decoding the scanned graphic code provided by the recipient matches the information of the recipient stored in the pre-set graphic code.

10. The method according to claim 9, wherein:
the coordinates of the current location of the unmanned aerial vehicle are consistent with the coordinates of the pre-determined location of the recipient if a difference between the coordinates of the current location of the unmanned aerial vehicle and the coordinates of the pre-determined location of the recipient is within a pre-set threshold value range, the threshold value range being an allowed coordinate deviation;
the graphic code comprises a two-dimensional code or a bar code;
the biological recognition information comprises at least one of fingerprint information of the recipient or iris information of the recipient, and the biological recognition feature is at least one of a fingerprint of the recipient or an iris of the recipient; and
the identity recognition card of the recipient comprises at least one of a second generation identity card, a social insurance card, a housing funds card, a passport, or a pass card.

11. The method according to claim 6, wherein locking the cargo comprises automatically locking the cargo when the unmanned aerial vehicle takes off or manually locking the cargo before the unmanned aerial vehicle takes off.

12. A system for delivering cargo with an unmanned aerial vehicle, comprising:
a configuration unit for:
configuring a first pre-set condition based on one or more conditions selected by a recipient from a first group of conditions, the first group of conditions including coordinates of a pre-determined location of the recipient, a pre-taken environment picture of a landing site of the unmanned aerial vehicle, and a pre-set guide signal; and
configuring a second pre-set condition based on one or more conditions selected by the recipient from a second group of conditions, the second group of conditions including pre-set biological recognition information of the recipient, pre-set voice print information of the recipient, a signature of the recipient, and a pre-set graphic code generated according to information about the recipient;
a locking unit for locking a cargo loaded on the unmanned aerial vehicle using an electronic security lock;
an acquisition unit for acquiring first verification information and second verification information, the first verification information identifying a current location of the unmanned aerial vehicle; the second verification information identifying an identity of the recipient and including one or more of: biological recognition information of the recipient and a signature of the recipient, the biological recognition information including one or more of a fingerprint scan, an iris scan, and a facial feature profile; and
an unlocking unit for unlocking the cargo by opening the electronic security lock when the first verification information satisfies the first pre-set condition and the second verification information satisfies the second pre-set condition, the unlocking unit including a determination unit for:
determining whether the first verification information satisfies the first pre-set condition; and
in response to determining that the first verification information satisfies the first pre-set condition, determining whether the second verification information satisfies the second pre-set condition.

13. The system according to claim 12, wherein:
the acquisition unit is configured for acquiring the first verification information including at least one of:
a location acquisition sub-unit for acquiring coordinates of a current location of the unmanned aerial vehicle,
a picture acquisition sub-unit for taking an environment picture of the landing site of the unmanned aerial vehicle, or
a guide signal acquisition sub-unit for receiving a guide signal sent by the recipient, and
the acquisition unit is further configured for acquiring the second verification information including at least one of:
an identity recognition card reading sub-unit for reading an identity recognition card of the recipient,
a biological recognition feature scanning sub-unit for scanning a biological recognition feature of the recipient,
a voice print acquisition sub-unit for receiving a voice input from the recipient and processing the voice to obtain corresponding voice print information,
an electronic signature recognition and acquisition sub-unit for recognizing and acquiring electronic signature information of the recipient, or
a graphic code scanning sub-unit for scanning a graphic code provided by the recipient and decoding the graphic code to obtain corresponding code information.

14. The system according to claim 13, wherein the determination unit is further configured for:

determining that the first verification information satisfies the first pre-set condition when at least one of following conditions is satisfied:

the coordinates of the current location of the unmanned aerial vehicle are consistent with the coordinates of the pre-determined location of the recipient;

the environment picture taken of the landing site of the unmanned aerial vehicle matches the pre-taken environment picture of the landing site of the unmanned aerial vehicle; and the received guide signal matches the pre-set guide signal and the unmanned aerial vehicle lands at a specified place according to the guide signal; and determining that the second verification information satisfies the second pre-set condition when at least one of following conditions is satisfied:

information obtained by reading the identity recognition card of the recipient is consistent with the pre-set identity information of the recipient;

the scanned biological recognition feature of the recipient matches the pre-set biological recognition information of the recipient;

the corresponding voice print information obtained by processing the received voice from the recipient is consistent with the pre-set voice print information of the recipient;

the acquired electronic signature information of the recipient matches the signature of the recipient; or the corresponding code information obtained by decoding the scanned graphic code provided by the recipient matches the information of the recipient stored in the pre-set graphic code.

15. The system according to claim 14, wherein:

if a difference between the coordinates of the current location of the unmanned aerial vehicle and the coordinates of the pre-determined location of the recipient is within a pre-set threshold value range, the coordinates of the current location of the unmanned aerial vehicle are determined to be consistent with the coordinates of the pre-determined location of the recipient, the threshold value range being an allowed coordinate deviation;

the graphic code comprises a two-dimensional code or a bar code;

the biological recognition information comprises at least one of fingerprint information of the recipient or iris information of the recipient, and the biological recognition feature is at least a fingerprint of the recipient or an iris of the recipient; and the identity recognition card of the recipient comprises at least one of a second generation identity card, a social insurance card, a housing funds card, a passport, or a pass card.

16. The system according to claim 12, wherein the locking unit is further configured for automatically locking the cargo when the unmanned aerial vehicle takes off or manually locking the cargo before the unmanned aerial vehicle takes off.

* * * * *